United States Patent

[11] 3,595,991

[72] Inventor Calvin D. Diller
Route 2, Box 46, Bluffton, Ohio 45817

[21] Appl. No. 744,038
[22] Filed July 11, 1968
[45] Patented July 27, 1971

[54] COLOR DISPLAY APPARATUS UTILIZING LIGHT-EMITTING DIODES
3 Claims, 5 Drawing Figs.

[52] U.S. Cl. ........ 178/5.4 EL, 178/7.3 D
[51] Int. Cl. ........ H04n 9/12, H04n 3/14
[50] Field of Search ........ 178/7.5 D, 7.3 D, 7.1, 5.4 EL, 5.4; 340/166, 172.5; 313/108 D; 315/169 TV; 250/209; 307/244, 241, 221, 223

[56] References Cited
UNITED STATES PATENTS

| | | | |
|---|---|---|---|
| 3,293,356 | 12/1966 | Aiken | 178/5.4 |
| 3,479,517 | 11/1969 | Bray et al. | 313/108 |
| 3,511,925 | 5/1970 | Lee et al. | 178/7.3 D |

*Primary Examiner*—Robert L. Griffin
*Assistant Examiner*—John C. Martin
*Attorney*—Owen and Owen

ABSTRACT: A two-dimensional visual display apparatus for presenting color television information received from a composite television signal. In place of a conventional cathode-ray tube, the apparatus has a display panel comprised of a plurality of closely spaced triads of light-emitting diodes arranged in a plurality of closely spaced horizontal rows. Each triad consists of three closely spaced light-emitting diodes, each having an electroluminescent output of a different primary color. Conventional circuitry is used to detect and convert a composite color television signal into its luminance, chrominance, and scanning components. A grid sweep unit is provided to successively apply the amplified video signals across the rows of diode triads causing them to be actuated in accordance with the signals applied thereto to provide the visual display or picture. In the disclosed embodiment, the horizontal and vertical sweep units consist of a pyramid of bistable switches whose sequential outputs are applied to logic circuits operatively connected to the diode triads such that the video signals are caused to successively sweep the rows of triads.

INVENTOR:
CALVIN D. DILLER.
BY [signature]
ATT'YS.

INVENTOR:
CALVIN D. DILLER
BY
[signature]
ATT'YS.

INVENTOR:
CALVIN D. DILLER.
BY
ATT'YS.

COLOR DISPLAY APPARATUS UTILIZING LIGHT-EMITTING DIODES

This invention relates to a two-dimensional visual display apparatus capable of detecting, converting and presenting a color picture transmitted by a composite color television signal and which apparatus has no cathode-ray picture tube as is normally associated with color television receivers.

Present color television receivers in wide commercial use include a cathode-ray tube having a plurality of electron guns whose beams are focused upon and swept across a phosphor grid on the inner face of the tube to activate the phosphor dots to present the color picture. While such systems are highly developed and present satisfactory results, one of the commercial disadvantages is in the cost of the tube and in the amount of space taken up by the tube envelope which is the determining factor in the physical size of television receivers.

The present invention is advantageous in that a two-dimensional picture corresponding in horizontal and vertical size to that of presently known color television receivers may be provided with a minimum of depth (the distance measured perpendicular to the picture face) through the use of a picture area or grid of solid-state devices whose electroluminescent output is dependent upon the electrical input thereto. The advantages of such a device which eliminates the vacuum-filled glass envelope are apparent in that size is decreased, and maintenance and reliability of the receiver are greatly improved.

Other objects and advantages of the instant invention will be apparent to those skilled in the art, reference being made to the accompanying drawings, in which.

Figure 1:
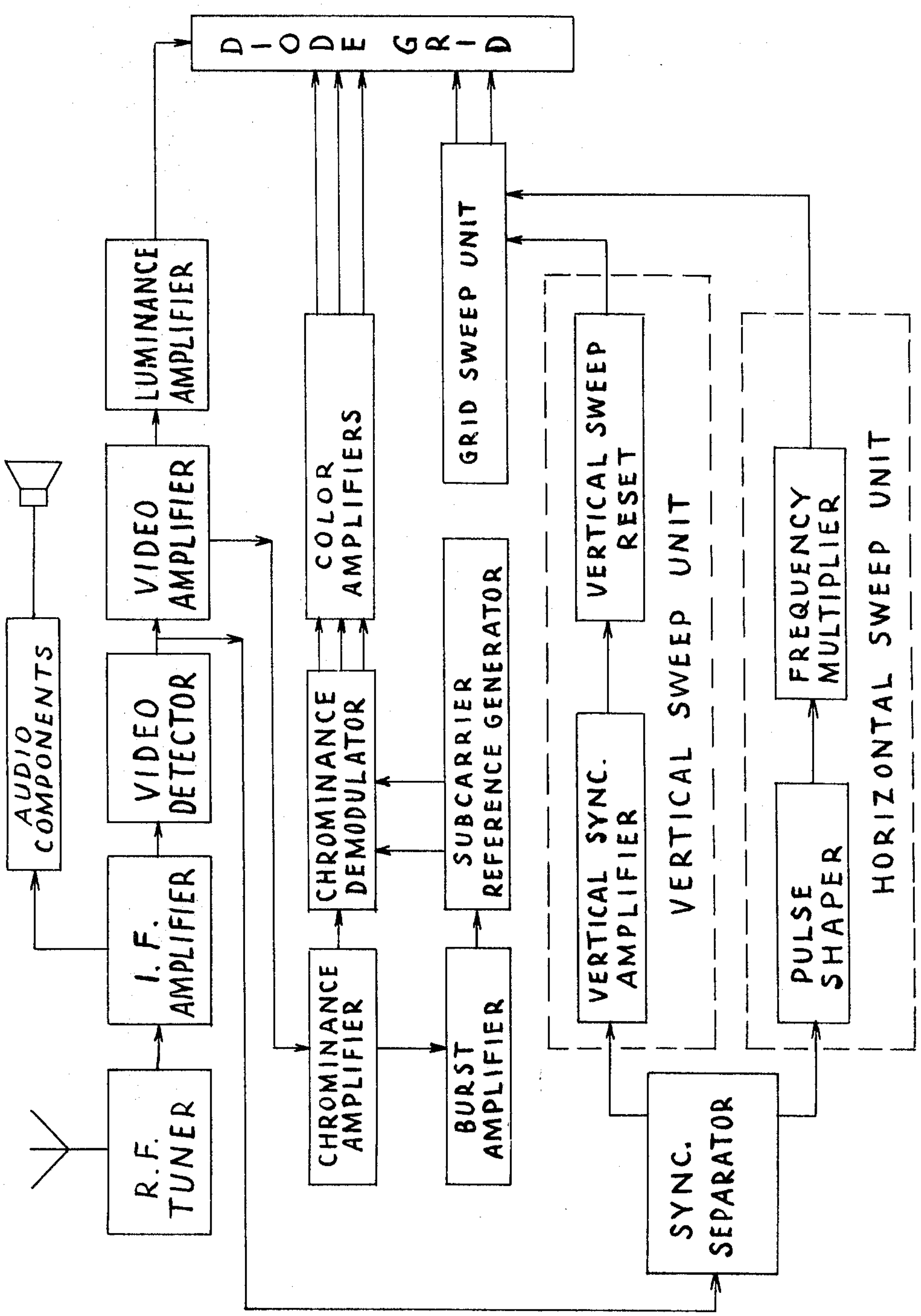
FIG. 1 is a schematic circuit diagram of the visual display apparatus of this invention, showing the diode grid and grid sweep units which form a part of this invention associated with the conventional color television chassis components which would be necessary for a complete color signal receiving unit.

Referring briefly to FIG. 1, the components of a complete color television receiver are shown as they would be connected to the diode grid and grid sweep units which form a part of the instant invention. With the exception of the diode grid, the grid sweep unit and the vertical and horizontal sweep units, the remaining components are essentially similar to those conventionally used in commercially available color television receivers and whose operation, theory and purpose are well known to those skilled in the art. For further description of these units, specific reference is made to the publication "Principles of Color Television," McIlwain et al., (John Wiley & Sons, 1956).

Very briefly, the composite color television signal received by the RF tuner is separated into its audio and video components, the latter being further separated into the luminance signal component, the three chrominance signal components of the primary colors, red, blue and green, and the scanning signal which is separated and applied to the vertical and horizontal sweep units.

Figure 2:
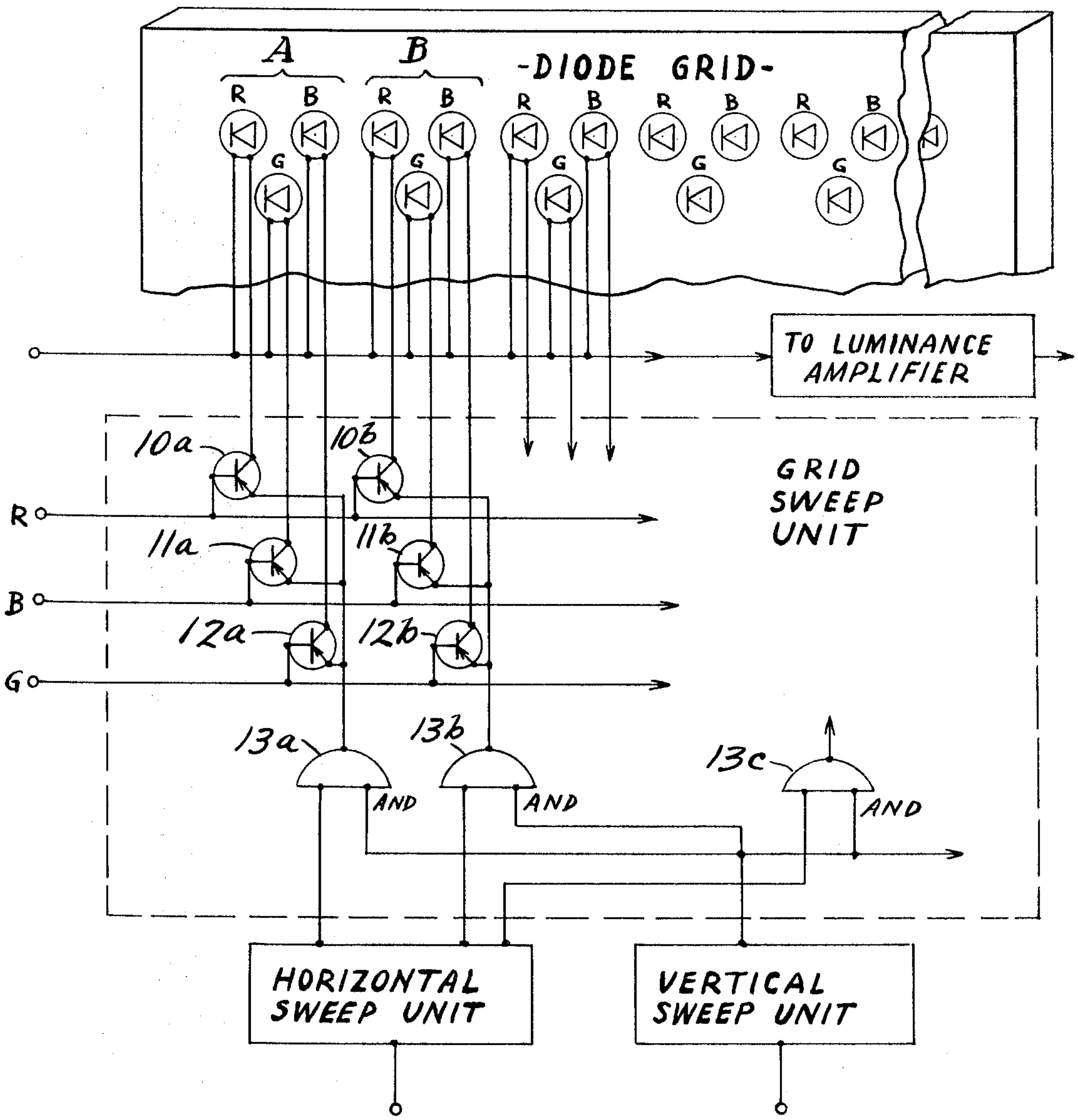
FIG. 2 is a schematic view, partially in perspective, and on a greatly enlarged scale, showing in detail a small portion of the diode grid which comprises the picture displaying portion of the receiver and the manner in which the light-emitting diodes in the grid are connected to the grid sweep unit and the video input signals from the chassis components shown in FIG. 1.

Referring to FIG. 2, the display device of the instant invention is, in effect, a grid comprised of a plurality of triads of light-emitting diodes spaced closely together in horizontal rows. Only a portion of a single horizontal row is shown in FIG. 2. In a monochrome device of the nature of the instant invention, single light-emitting diodes would be used to form the rows of the grid. In the color display device, as illustrated in FIG. 2, each triad of diodes consists of three separate diodes, each one having an electroluminescent output corresponding to the primary color being received in the composite television signal, such as red, blue and green.

Light-emitting diodes, or solid-state lamps, are presently commercially available from the miniature lamp department of the General Electric Company, Nela Park, Cleveland, Ohio 44112, and are described in detail in Bulletin 3–7041 of that company. In general, the devices are highly reliable, are capable of extremely fast switching, are vibration and shock resistant, and are subject to no theoretical failure if operated at the proper rating, thereby making them far more advantageous for this purpose than filament or gas-filled glow lamps.

As shown in FIG. 2, if triads or groups of three of such light-emitting diodes are closely arranged in horizontal rows, as is shown on a greatly expanded scale, and if the chrominance or color input signals from the receiver component shown in FIG. 1 are caused to sweep across the diode grid horizontally and successively down the horizontal rows, a color television display is provided without the use of a cathode-ray tube and its attendant limitations. Because the light-emitting diodes are solid-state devices which change electrical energy directly into light energy without passing through an intermediate thermal stage, as is characteristic of incandescent lamps, their extremely fast response to current change and immunity to shock and vibration makes them readily adaptable for this purpose. In addition, because of the wide variety of color output available from such diodes, the selection of particular diodes to correspond to any desired output colors available, other than the primary colors of red, blue and green illustrated in this application, is available to the designer of such an apparatus in the event that certain color modifications in the display device are desirable.

Referring to the grid sweep unit illustrated in FIG. 2, each of the individual diodes R, B or G of a single triad A in the diode grid is connected to a single amplifier transistor 10*a*, 11*a*, 12*a*, etc., whose collectors are directly connected to one lead of the diodes in triad A, and whose emitters are connected in series to the output of an AND circuit 13*a* as shown. The base of each of the transistors 10*a*—12*a*, etc., is operatively connected to the portion of the chrominance signal component to be applied to the light-emitting diode of corresponding primary color. The other lead of each of the diodes is operatively connected to the luminance signal component as shown. Each of the transistors 10*a*—12*a*, etc., is so biased as to be nonconducting in the absence of an output signal from its respective AND circuit 13*a*, etc., so that the actuation of each of the diodes of each triad is controlled by the state of conduction of the series of AND circuits whose input terminals are connected to the horizontal and vertical sweep units, as will be subsequently explained.

Figure 3:
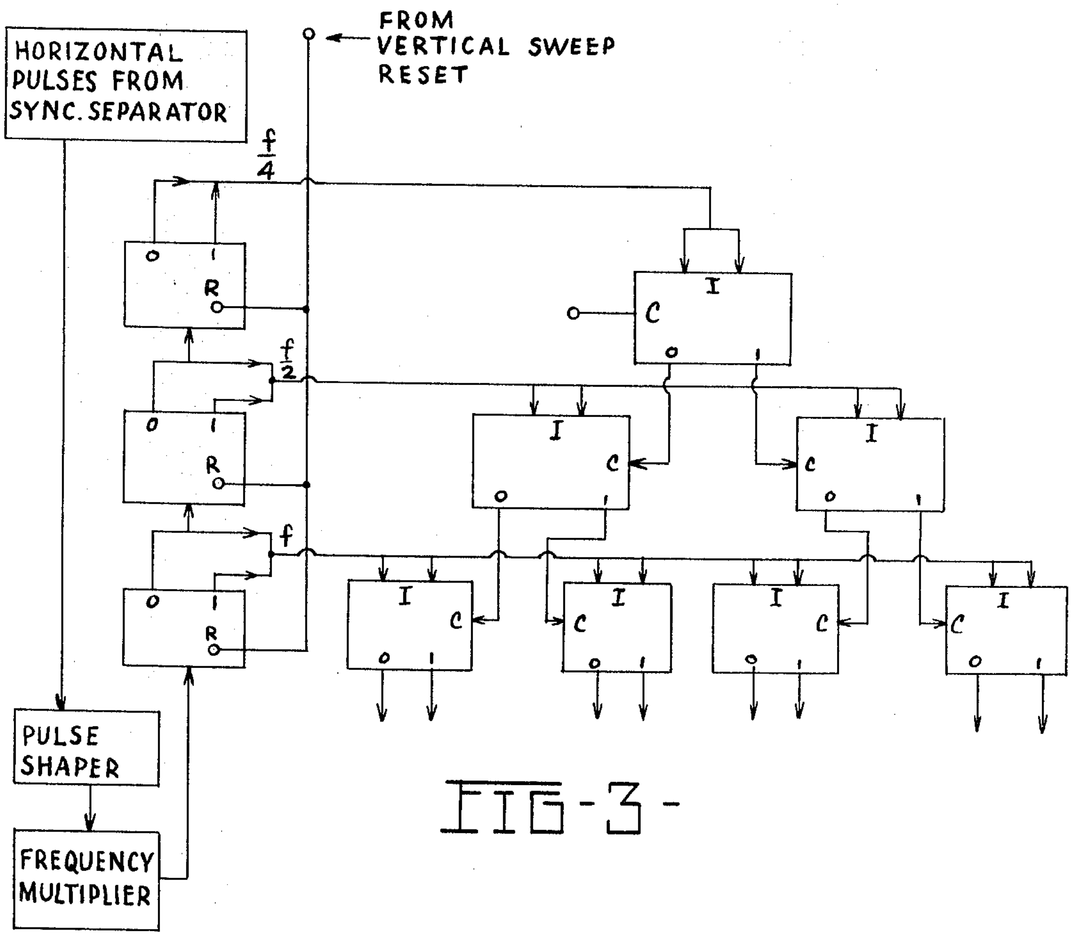
FIG. 3 is a schematic circuit diagram of a portion of the horizontal sweep unit whose output is applied to the grid sweep unit shown in FIG. 2.
Figure 4:
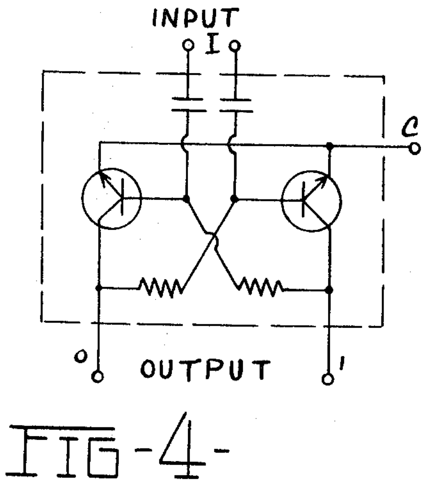
FIG. 4 is a circuit diagram of one embodiment of a bistable switch which can be connected in pyramid fashion to provide the horizontal sweep unit schematically shown in FIG. 3.
Figure 5:
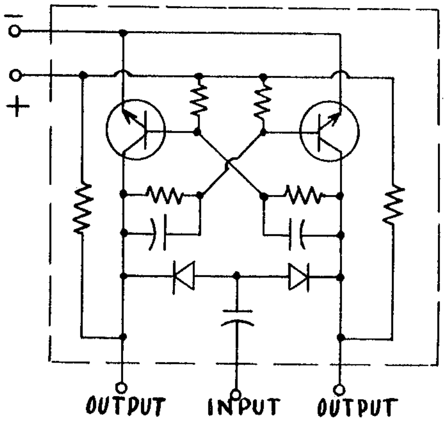
FIG. 5 is a circuit diagram of another embodiment of a bistable switch which can be used as a frequency divider used in the grid sweep unit shown in FIG. 3.

The horizontal and vertical sweep units, in the embodiment described, consist of a plurality of bistable switches or "flip-flops" connected in pyramid fashion to cascade their output signals to the input signals of the next stage below so that the frequency of the switching action is multiplied to the point where the switching output frequency of the lowermost stage of bistable switches is equal to the desired horizontal or vertical sweep frequency. For example, if each of the bistable switches illustrated in the pyramid configuration of FIG. 3 is a flip-flop circuit of the type shown in FIG. 4 having a pair of input terminals, a pair of output terminals, and a single power supply terminal, with the output terminals "zero" and "one" connected to the power supply terminals "C" of two units immediately below it, and with the input terminals "I" connected to an input frequency from a plurality of frequency dividers as shown, and with the lowermost level of switches having a frequency F, the next level having an applied frequency of ½F with the next upper level having an applied frequency of ¼F, the switching action at the output terminals "0" and "1" will progress successively across the lowermost level of switches, from left to right, to thus sweep at the desired sweep frequency. The horizontal sweep pulse from the sync separator shown in FIG. 1 is connected to a pulse shaper and then to a conventional frequency multiplier which obtains the desired frequency F to be applied to the input terminals "I" of the lowermost level of bistable switches. The frequency dividers used for the upper levels can be bistable switches of the type shown in FIG. 5 having a single input terminal with two output terminals as shown, with the outputs of one frequency divider applied to the input of the frequency divider immediately thereabove, as illustrated.

It will be understood that each horizontal line of the triads in the diode grid will have its own series of horizontal sweeping bistable switches and that a vertical sweep unit of a similar nature is connected to each of the horizontal sweep units in the manner illustrated in FIG. 2. As shown in FIG. 2, the output of the lowermost level of bistable switches is successively connected to the series of AND circuits 13*a*, etc., while the other input terminal of the AND circuit is connected to the vertical sweep unit. As previously explained, the output from any given AND circuit is dependent upon the presence of two inputs, from the horizontal sweep unit and the vertical sweep unit. It will thus be apparent that with the horizontal sweep units and the vertical sweep unit in sweep operation, the color signals will be successively applied across the horizontal rows of diode triads, and will progress successively down the triad rows until it reaches the end of the last row at which point it is reset to resume the picture sweep at the top horizontal row. The necessary frequency multipliers and dividers, as well as the numbers of bistable switches in the pyramid configuration necessary to apply the proper sweep frequency to the diode grid will be apparent to those skilled in the art. It will also be apparent that the system thus far described may be adapted to be compatible with presently broadcast composite television signals which have 525 horizontal scanning lines. With a scanning circuit of the type described using bistable switches, the total number of bistable switches at the lowermost level must be a power of the number 2. The first power of 2 sufficient for 525 scanning lines is $2^{10}$ or 1024, so that a reset circuit is necessary to reset this sweeping unit after the completion of 525 lines.

It is to be understood that the above-described embodiments of the horizontal and vertical sweep units utilizing the cascading effect of bistable switches arranged in a pyramid configuration presents only one possible method of presenting a sequentially scanning signal which is applied to the diode triads in the grid and that other methods of providing such scanning signal at the desired frequencies will be apparent to those skilled in the art.

The invention thus described will provide a visual display apparatus capable of presenting a color picture transmitted by a composite television signal and has the previously enumerated advantages due to the elimination of the cathode-ray tube. In addition, the present invention has the distinct advantage in that each of its operating components is relatively simple and may be incorporated in microcircuitry utilizing a minimum of space so that the entire receiving unit would have a depth, measured in a direction normal to the plane of the display grid, much less than in conventional television receiving apparatus. The entire circuitry can be arranged in a single layer with the light-emitting diodes being placed on an upper exposed layer and integrated circuits containing the amplifying transistors, AND circuits, and sweep units being in adjacent layers with the remaining color receiver components similarly provided in microcircuitry.

Various modifications of the above-described preferred embodiments of this invention will be apparent to those skilled in the art and may be made without departing from the scope of the attached claims.

I claim:

1. A visual display apparatus for detecting and converting information received from a composite television signal and for displaying such information in a two-dimensional picture, comprising, in combination, a two-dimensional visual display panel having a plurality of closely spaced, horizontal rows of light-emitting diodes, said rows of light-emitting diodes forming a visual grid for such information display, means for detecting and converting a television signal into a visual component, a horizontal sweep component and a vertical sweep component, a grid sweep unit operatively connected to said visual display panel and to said horizontal and vertical sweep signal components and effective to cause said visual signal component to be successively applied to diodes in said rows and to progress downwardly through successive rows whereby said visual signal component will scan said visual grid and will actuate selected diodes in accordance with information conveyed by said visual signal component to provide a visual display thereof, said grid sweep unit including (1) a plurality of AND circuits operatively connected to said visual display panel, each of said AND circuits having a horizontal and a vertical input terminal and an output terminal operatively connected to a corresponding light-emitting diode whereby said corresponding diode will be activated by said visual signal component only during the presence of both a horizontal and a vertical input signal at the AND circuit thereof, and wherein the input signal to said AND circuits is provided by a plurality of bistable switches arranged in pyramid fashion, each of said switches having a pair of input terminals and a pair of output terminals and a power supply terminal with the outputs of the first of said switches operatively connected to the power supply terminal of two switches below it in cascade fashion and means for applying said horizontal and vertical sweep signal component to the input terminal of said switches to successively trigger the lowermost row of bistable switches sequentially across said row.

2. A visual display apparatus for detecting and presenting information received from a composite color television signal and displaying such information in a two-dimensional color picture comprising, in combination, a two-dimensional visual display panel having a plurality of closely spaced, horizontal rows of triads of light-emitting diodes, each triad of diodes including diodes having electroluminescent outputs of different primary colors, said rows of triads of diodes forming a grid for such information display, means for detecting and converting a color television signal into a chrominance signal component of three primary colors corresponding to the electroluminescent output colors of said triads of diodes, a horizontal sweep signal component and a vertical sweep signal component, a grid sweep unit operatively connected to said horizontal and vertical sweep signal components and to said information display grid and effective to successively sweep said chrominance signal component horizontally across adjacent triads of diodes in a horizontal row and successively down said rows of diode triads to successively actuate each of said diodes within said triads in accordance with the chrominance signal applied thereto to provide a color visual display on said diode grid, said grid sweep unit comprising horizontal and vertical units having a plurality of bistable switches arranged in pyramid fashion, each of said switches having a pair of input terminals and a pair of output terminals and a power supply terminal with the outputs of the first of said switches operatively connected to the power supply terminal of two switches below it in cascade fashion and means for applying said horizontal or vertical sweep signal components to the input terminals of said switches to successively trigger the lowermost row of bistable switches sequentially across said row.

3. The visual display device of claim 2 which further includes a plurality of frequency dividers operatively connected to said horizontal sweep signal component and to the input terminals of said pyramid of bistable switches wherein each of said bistable switches receives said horizontal sweep signal component at one-half the frequency as those units connected immediately below it in said bistable switch pyramid.